United States Patent
Isaac et al.

(10) Patent No.: US 9,969,230 B2
(45) Date of Patent: May 15, 2018

(54) TOP MOUNT ASSEMBLY HAVING ADJUSTABLE DAMPING CHARACTERISTICS

(71) Applicant: BeijingWest Industries, Co., Ltd., Beijing (CN)

(72) Inventors: Bobby Isaac, Englewood, OH (US); David John Barta, Beavercreek, OH (US); Timothy Michael Schlangen, Kettering, OH (US)

(73) Assignee: BeijingWest Industries Co., Ltd., Beijing (CN)

( * ) Notice: Subject to any disclaimer, the term of this patent is extended or adjusted under 35 U.S.C. 154(b) by 0 days. days.

(21) Appl. No.: 15/430,868

(22) Filed: Feb. 13, 2017

(65) Prior Publication Data

US 2017/0291464 A1    Oct. 12, 2017

Related U.S. Application Data

(60) Provisional application No. 62/321,083, filed on Apr. 11, 2016.

(51) Int. Cl.
*F16F 9/34* (2006.01)
*B60G 13/00* (2006.01)
(Continued)

(52) U.S. Cl.
CPC ......... *B60G 13/003* (2013.01); *B60G 15/067* (2013.01); *F16F 9/535* (2013.01);
(Continued)

(58) Field of Classification Search
CPC .... F16F 9/34; F16F 9/54; F16F 13/105; F16F 13/305; B60G 13/001; B60G 13/003; B60G 15/067; B60G 15/068
(Continued)

(56) References Cited

U.S. PATENT DOCUMENTS 4,711,463 A    12/1987   Knable et al.
5,330,166 A *   7/1994   Aoki ................. B60G 15/068
                                             267/220

(Continued)

FOREIGN PATENT DOCUMENTS

EP    1803961    4/2007

OTHER PUBLICATIONS

European Search Report dated Oct. 5, 2017 (10 Pages).

*Primary Examiner* — Christopher P Schwartz
(74) *Attorney, Agent, or Firm* — William H. Honaker; Dickinson Wright PLLC

(57) ABSTRACT

A top mount assembly including a housing for being connected to the frame of the vehicle. A rod connection assembly is disposed in the housing for being attached to a piston rod of the damper assembly. A chamber is defined between the rod connection assembly and the housing for receiving a fluid. A resilient member is disposed between the rod connection assembly and the housing. A partition assembly is positioned between the resilient member and the housing and axially divides the chamber into an upper chamber region and a lower chamber region. The partition assembly defines at least one passage that extends between the upper chamber region and the lower chamber region. At least one electromagnetic coil is disposed adjacent to the passage for selectively modifying the characteristics of the fluid passing through the passage to modify the damping characteristics of the top mount assembly.

20 Claims, 2 Drawing Sheets

(51) Int. Cl.
  *B60G 15/06* (2006.01)
  *F16F 9/54* (2006.01)
  *F16F 13/10* (2006.01)
  *F16F 13/30* (2006.01)
  *F16F 9/53* (2006.01)

(52) U.S. Cl.
  CPC .............. *F16F 9/54* (2013.01); *F16F 13/105* (2013.01); *F16F 13/305* (2013.01); *B60G 2202/25* (2013.01); *B60G 2204/128* (2013.01); *B60G 2204/41* (2013.01); *B60G 2204/4502* (2013.01)

(58) Field of Classification Search
  USPC ........................ 267/140.14, 140.15, 219, 220
  See application file for complete search history.

(56) References Cited

U.S. PATENT DOCUMENTS

| | | | |
|---|---|---|---|
| 5,595,374 A * | 1/1997 | Charette | B60G 15/067 267/140.14 |
| 6,186,486 B1 | 2/2001 | Gutman et al. | |
| 6,622,995 B2 | 9/2003 | Baudendistel et al. | |
| 6,655,669 B1 * | 12/2003 | Jung | B60G 13/001 267/219 |
| 8,439,336 B2 * | 5/2013 | Moore | B60G 15/068 267/140.13 |
| 9,322,451 B2 | 4/2016 | Schumann et al. | |
| 2006/0125164 A1 | 6/2006 | Mansueto et al. | |
| 2014/0217660 A1 | 8/2014 | Setty et al. | |

* cited by examiner

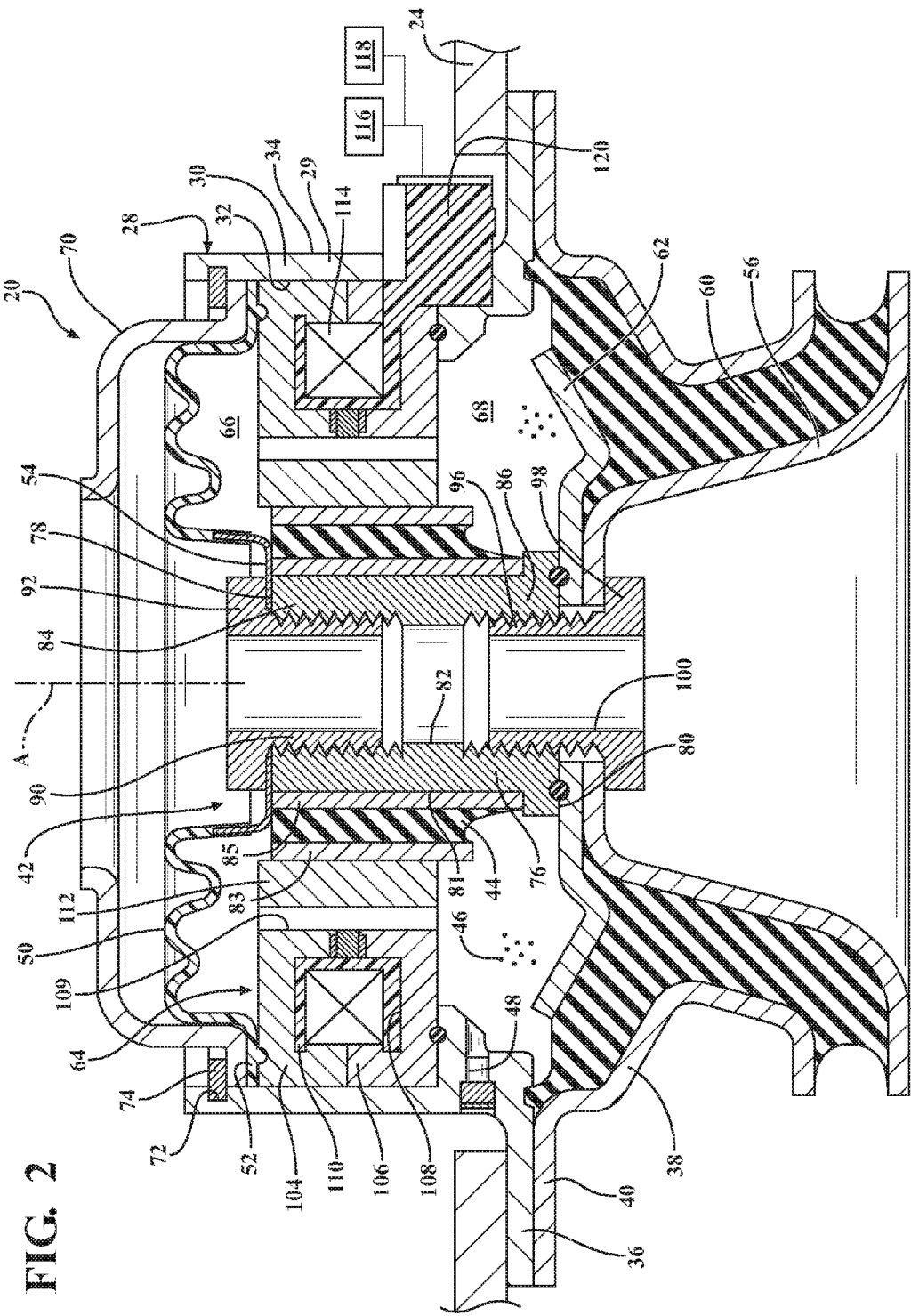

TOP MOUNT ASSEMBLY HAVING ADJUSTABLE DAMPING CHARACTERISTICS

CROSS REFERENCE TO RELATED APPLICATION

This application claims the benefit of U.S. Provisional Patent Application Ser. No. 62/321,083 filed on Apr. 11, 2016, and titled "MAGNETORHEOLOGICAL TOP MOUNT", the entire disclosure of which is hereby incorporated by reference.

BACKGROUND OF THE INVENTION

1. Field of the Invention

A top mount assembly for interconnecting a damper assembly and a frame of a vehicle. More particularly, a top mount assembly having adjustable damping characteristics.

2. Description of the Prior Art

Top mount assemblies are part of the damper assembly of a vehicle suspension system. A top mount assembly is typically connected to and disposed between a frame of the vehicle and a piston rod, and is utilized to isolate and reduce the transmission of road inputs to the frame and to assist in vehicle handling. An example of a conventional top mount assembly is disclosed in U.S. Pat. No. 5,158,269 to Hein et al., which includes a housing disposed about an axis for being connected to the frame of the vehicle. A rod connection assembly is disposed in the housing for being attached to a piston rod of the damper assembly. A plurality of resilient members are positioned between the rod connection assembly and the housing to allow relative movement between the rod connection assembly and the housing to provide a shock absorbing effect.

It is known for the components of conventional top mount assemblies to be configured to provide improved vibration isolation, however, such arrangements typically lead to worsened vehicle handling, and vice versa. These tradeoffs persist between isolation and handling where a balance is desirable. Accordingly, there remains room for improvements to top mount assemblies to provide both improved isolation and vehicle handling characteristics

SUMMARY OF THE INVENTION

A top mount assembly for interconnecting a damper assembly and a frame of a vehicle. The top mount assembly includes a housing disposed about an axis for being connected to the frame of the vehicle. A rod connection assembly is disposed in the housing for being attached to a piston rod of the damper assembly. A chamber is defined between the rod connection assembly and the housing for receiving a fluid. A resilient member is disposed between the rod connection assembly and the housing and allows relative movement between the rod connection assembly and the housing. A partition assembly is positioned between the resilient member and the housing and axially divides the chamber into an upper chamber region and a lower chamber region. The partition assembly defines at least one passage that extends between the upper chamber region and the lower chamber region to allow the fluid to pass between the upper and lower chamber regions during movement of the housing relative to the rod connection assembly to dampen the movement of the rod connection assembly relative to the housing. At least one electromagnetic coil is disposed adjacent to the passage for selectively modifying the characteristics of the fluid passing through the passage to modify the damping characteristics of the top mount assembly.

The invention in its broadest aspect therefore provides a damper assembly that has damping characteristics that are easily adjustable. More specifically, the current provided to the electromagnetic coil may instantaneously be modified to increase the shear resistance of the fluid, such as a magnetorheological fluid, in the passage, thereby modifying the damping stiffness of the top mount assembly. Accordingly, improved isolation and vehicle handling characteristics of the top mount assembly may instantly be provide as needed.

According to another aspect of the disclosure, the subject top mount assembly is compact and simple in design, and easy and inexpensive to manufacture.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 2 is a side cutaway view of the top mount assembly of FIG. 1 independent from the rest of the vehicle.

DESCRIPTION OF THE ENABLING EMBODIMENT

Figure 1:
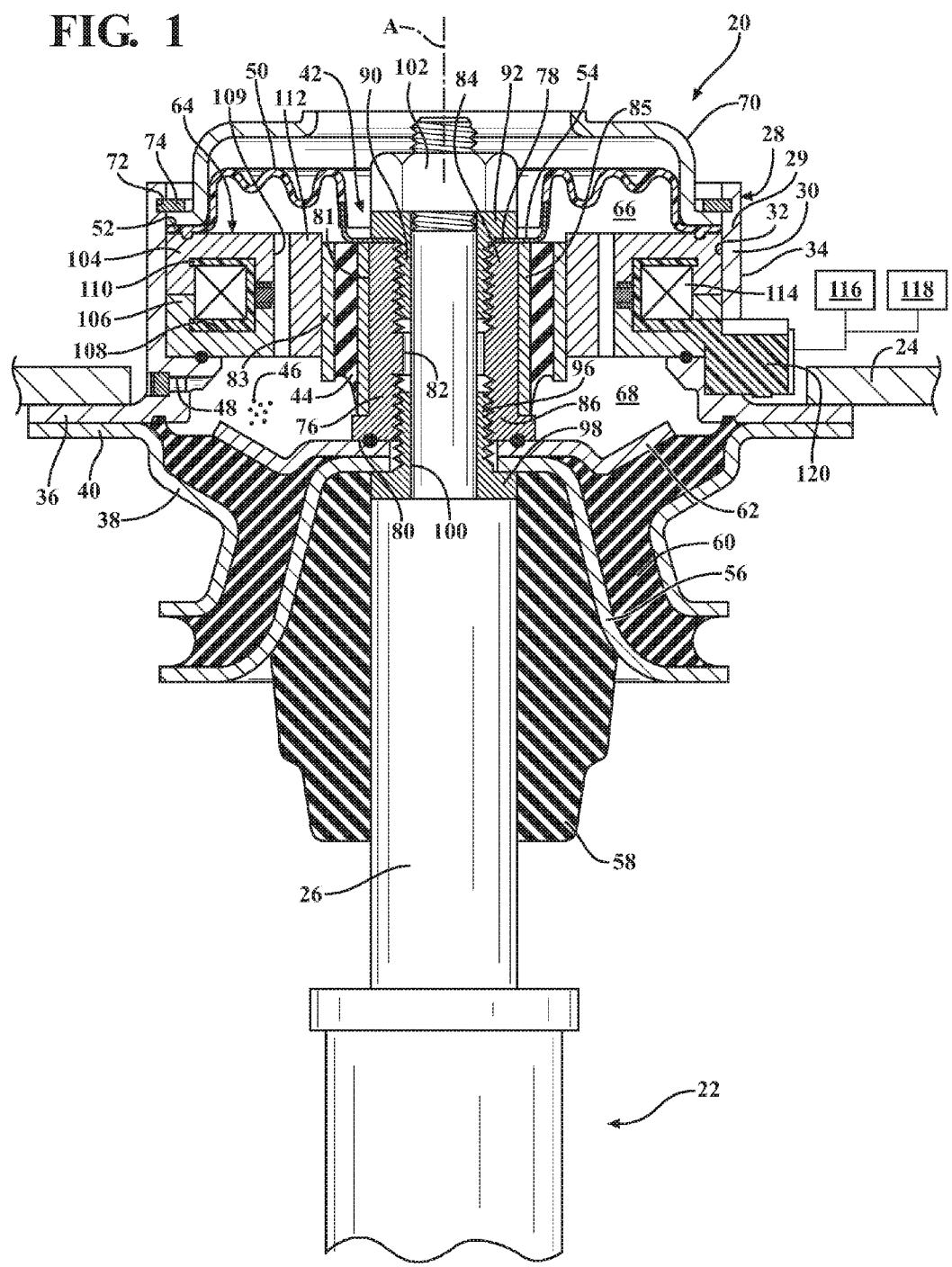
FIG. 1 is a side cutaway view of an example embodiment of a top mount assembly that is connected to a piston rod of a damper assembly and a frame of a vehicle.

Referring to the Figures, wherein like numerals indicate corresponding parts throughout the several views, a top mount assembly 20 is generally shown for interconnecting a damper assembly and a frame of a vehicle. It should be appreciated that the subject top mount assembly 20 can be utilized on various vehicles including, but not limited to, automobiles, motorcycles and recreational vehicles. FIG. 1 illustrates an example embodiment of the subject top mount assembly 20 connected to a piston rod 26 of a damper assembly 22 and a frame 24 (schematically shown) of a vehicle. FIG. 2 illustrates the example embodiment of the subject top mount assembly 20 separate from the rest of the vehicle.

The top mount assembly 20 includes a housing 28 that has a sidewall 29 that extends about and along an axis A. The sidewall 29 of the housing 28 includes an upper body segment 30 that generally has a tube shape. The upper body segment 30 has an inner surface 32 and an outer surface 34. The housing 28 also includes an upper flange 36 that extends radially outwardly from the outer surface 34 of the upper body segment 30. The sidewall 29 further has a lower body segment 38 that extends axially downwardly relative to the upper body segment 30. A lower flange 40 extends radially outwardly from the lower body segment 38 and underlies and is secured to the upper flange 36. Together, the upper and lower flanges 36, 40 define a mounting plate 36, 40 for being attached to the frame 24 of the vehicle to connect to the housing 28 to the vehicle (as illustrated in FIG. 2). It should be appreciated that the upper and lower flanges 36, 40 could be integrally connected to one another to define a one-piece housing.

A rod connection assembly 42 is disposed in the housing 28 along the axis A for being attached to the piston rod 26 of the damper assembly 22. A resilient member 44 interconnects the rod connection assembly 42 and the housing 28 for providing relative movement between the rod connection assembly 42 and the housing 28. In the example embodiment, the resilient member 44 is a generally tube-shaped bushing 44 that is made of an elastomeric material such as rubber. It should be appreciated, however, that the bushing 44 could be made of various flexible materials and could have other shapes.

A chamber 66, 68 is defined between the rod connection assembly 42 and the housing 28 for receiving a fluid 46. In the example embodiment, the fluid 46 is a magnetorheological fluid 46 which, as known in the art, is responsive to a magnetic field to modify its shear properties. More specifically, it has the ability to reversibly change from a free-flowing linear, viscous liquid to a semi-solid with controllable yield strength when exposed to a magnetic field. It should be appreciated that other fluids that have similar properties could be utilized. The upper body segment 30 defines a fill port 48 for receiving the fluid 46 into the chamber 66, 68.

A diaphragm 50 of a flexible materially is positioned in the housing 28 and extends radially between an outer segment 52 and an inner securement segment 54. The outer segment 52 engages the inner surface 32 of the upper body segment 30, and the inner securement segment 54 is connected to the rod connection assembly 42. The diaphragm 50 is positioned such that it defines an upper boundary of the chamber 66, 68 and may deform during the displacement of fluid 46 within the chamber 66, 68. It should be appreciated that the inner securement segment 54 and/or outer segment 52 may be made of a material that is different than that of the rest of the diaphragm 50, e.g., a stiff material such as metal, to provide a desirable connection between the diaphragm 50 and the housing 28/rod connection assembly 42.

A jounce rate washer 56 is disposed at least partially radially inwardly from the lower body segment 38. A jounce bumper 58 (shown in FIG. 2) may be disposed axially below and in engagement with the jounce rate washer 56. As is known in the art, the jounce bumper 58 may be positioned such that it limits travel of the piston rod 26 of the damper assembly 22. An elastomeric member 60 is disposed between the jounce rate washer 56 and the lower body segment 38. The elastomeric member 60 is positioned such that it may flex during relative movement between the rod connection assembly 42 and the housing 28. The elastomeric member 60 may be made of various elastomeric materials such as rubber. A rebound rate washer 62 overlies the elastomeric member 60 in the chamber 66, 68. The jounce rate washer 56 is positioned such that it limits downward movement of the elastomeric member 60 during a compression stroke of the piston rod 26, and the rebound rate washer 62 is positioned such that it limits upward movement of the elastomeric member 60 during a rebound stroke of the piston rod 26, thereby protecting the chamber 66, 68 to prevent leakage of the fluid 46 contained therein.

A partition assembly 64 is disposed in the chamber 66, 68, radially between the inner surface 32 of the upper body segment 30 and the rod connection assembly 42, and axially between the diaphragm 50 and the elastomeric member 60. The partition assembly 64 divides the chamber into an upper chamber region 66 between the partition assembly 64 and the diaphragm 50, and a lower chamber region 68 between the partition assembly 64 and the elastomeric member 60. The resilient member 44 is disposed between and connected to the partition assembly 64 and the rod connection assembly 42.

A cap 70 is positioned radially against the inner surface 30 of the upper body segment 28 axially above the diaphragm 50 and extends axially past the upper body segment 30 for protecting the diaphragm 50. The inner surface 32 of the upper body segment 30 defines a notch 72 adjacent to the cap 70. A snap ring 74 is received by the notch 72 and axially engages the cap 70 for axially securing the cap 70 against the diaphragm 50.

The rod connection assembly 42 includes a rod support 76 that generally has a tube shape and extends axially between an upper end 78 and a lower end 80 along an outside wall 81. The resilient member 44 is connected to the outside wall 81 of the rod support 76. More specifically, an inner ring 85 is fixed to the resilient member 44 and the rod connection assembly 42 to interconnect the resilient member 44 and the rod connection assembly 42. Furthermore, an outer ring 83 is fixed to the resilient member and the partition assembly 64 to interconnect the resilient member 44 and partition assembly 64. In the example embodiment, the outer and inner rings 83, 85 are of a rigid material and are each bonded to the resilient member 44. Furthermore, the outer ring 83 is pressed into the partition assembly 64 and the inner ring 85 is pressed into the rod support 76. As an alternative, the inner ring 85 could be removed and the resilient member 44 could be bonded directly to the rod support 76. The rod support 76 defines a channel 82 that extends along the axis A between the upper and lower ends 78, 80. An upper threaded portion 84 is defined in the channel 82 adjacent to the upper end 78, and a lower threaded portion 86 is defined in the channel 82 adjacent to the lower end 80.

An upper insert 90, 92 is provided that has an axially extending body portion 90 and a flange portion 92. The flange portion 92 extends radially outwardly from the body portion 90. Likewise, a lower insert 96, 98 is provided that has an axially extending shaft portion 96 and a lip portion 98. The lip portion 98 extends radially outwardly from the shaft portion 96. The body portion 90 of the upper insert 90, 92 is threadedly received by the upper threaded portion 84 of the rod support 76, and the shaft portion 96 of the lower insert 96, 98 is threadedly received by the lower threaded portion 86 of the rod support 76. The upper and lower inserts 90, 92, 96, 98, together, define an axially extending rod channel 100 for receiving the piston rod 26 of the damper assembly 22. As illustrated in FIG. 1, after the piston rod 26 has been received by the rod channel 100, it may be secured to the upper insert 90, 92 with a nut 102 or other connecting device.

The inner securement segment 54 of the diaphragm 50 is axially secured between the flange portion 92 of the upper insert 90, 92 and the rod support 76. Accordingly, when the upper insert 90, 92 is threadedly coupled to the rod support 76, the upper chamber region 66 is sealed at the rod support 76. Similarly, the jounce rate washer 56 and the rebound rate washer 62 are secured axially between the lip portion 98 of the lower insert 96, 98 and the rod support 76. Accordingly, when the lower insert 96, 98 is threadedly coupled to the rod support 76, the lower chamber portion 68 is sealed at the rod support 76. In view of the foregoing, the rod support 76, upper insert 90, 92 and lower insert 96, 98, together, comprise a simple mechanism for securing the diaphragm 50, jounce rate washer 56 and rebound rate washer 62 in place while also reliably sealing the upper and lower chamber portions 66, 68 to prevent leakage of the fluid 46 contained therein. This arrangement of components also advantageously allows conventional piston rods to be attached to the top mount assembly 20.

The partition assembly 64 includes a coil support 104, 106 that is positioned radially against the inner surface 32 of the of the upper body segment 30. The coil support 104, 106 includes an upper member 104 and a lower member 106, with the upper member 104 disposed axially above the lower member 106. The outer segment 52 of the diaphragm 50 is axially secured between the cap 70 and the upper member 104 of the coil support 104, 106 to seal the chamber 66, 68 between the cap 70 and the upper member 104.

The upper and lower members 104, 106 of the coil support define a coil compartment 108. A bobbin 110 is received by the coil compartment 108. A flux ring 112 is disposed radially between the coil support 104, 106 and the resilient member 44. The flux ring 112 is made of a material having a relatively high magnetic permeability for concentrating a magnetic flux. At least one passage 109 is defined radially between the flux ring 112 and the coil support 104, 106 and extends axially between the upper chamber region 66 and the lower chamber region 68 to allow fluids 46 to pass between the upper and lower chamber regions 66, 68 during movement of the housing 28 relative to the rod connection assembly 42 to provide a damping effect.

At least one electromagnetic coil 114 is disposed in the coil compartment 108 about the bobbin 110 for transmitting a magnetic flux across the passage 109 to the flux ring 112 to vary the viscosity of the magnetorheological fluid 46 passing through the passage 109, thus changing the damping characteristics of the top mount assembly 20. More specifically, the flux generated by the at least one electromagnetic coil 114 increases the viscosity of the magnetorheological fluid 46 to increase the shear resistance of the magnetorheological fluid 46 in the passage 109, thereby increasing the damping stiffness of the top mount assembly 20. It should be appreciated that any number of electromagnetic coils 114 may be utilized. A controller 116 (schematically shown) is electrically connected to the at least one electromagnetic coil 114 for selectively controlling the current produced by electromagnetic coil 114. Furthermore, a power source 118 (schematically shown) is electrically connected to the electromagnetic coil 114 for powering the electromagnetic coil 114. An electrical connector 120 is electrically connected to the electromagnetic coil 114 for providing a connection hub for the controller 116 and the power source 118. In view of the foregoing, because of the aforementioned magnetorheological damping components, the subject top mount assembly 20 is able to isolate or dampen vibrations at multiple frequencies to optimize ride, comfort and handling characteristics of the vehicle.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A top mount assembly for interconnecting a damper assembly and a frame of a vehicle, said top mount assembly comprising:
   a housing disposed about an axis for being connected to the frame of the vehicle;
   a rod connection assembly disposed in said housing for being attached to a piston rod of the damper assembly;
   a chamber defined between said rod connection assembly and said housing for receiving a fluid;
   a resilient member disposed between said rod connection assembly and said housing and allowing relative movement between said rod connection assembly and said housing;
   a partition assembly positioned between said resilient member and said housing and axially dividing said chamber into an upper chamber region and a lower chamber region;
   said partition assembly defining at least one passage extending between said upper chamber region and said lower chamber region to allow said fluid to pass between said upper and lower chamber regions during movement of said housing relative to said rod connection assembly to dampen the movement of said rod connection assembly relative to said housing; and
   a least one electromagnetic coil disposed adjacent to said passage for selectively modifying the characteristics of said fluid passing through said passage to modify the damping characteristics of said top mount assembly.

2. A top mount assembly as set forth in claim 1 wherein said resilient member is a bushing of a rubber material and having a generally tube shape.

3. A top mount assembly as set forth in claim 1 wherein said fluid is a magnetorheological fluid.

4. A top mount assembly as set forth in claim 1 wherein said housing has a sidewall and a mounting plate extending radially outwardly from said sidewall for being connected to the frame of the vehicle.

5. A top mount assembly as set forth in claim 1 wherein said rod connection assembly includes a rod support extending axially between an upper end and a lower end along an outside wall, wherein said rod connection assembly defines a channel extending axially between said upper end and said lower end, and wherein said resilient member is coupled with said outside wall.

6. A top mount assembly as set forth in claim 5 further including an outer ring fixed to said resilient member and said partition assembly to interconnect said resilient member and said partition assembly, and an inner ring fixed to said resilient member and said rod connection assembly to interconnect said resilient member and said rod connection assembly.

7. A top mount assembly as set forth in claim 5 further including an upper insert having a body portion received by said channel at said upper end of said rod support and coupled to said rod support;
   a lower insert having a shaft portion received by said channel at said lower end of said rod support and coupled to said rod support;
   and wherein said upper and lower inserts define a passage extending axially therethrough for receiving the piston rod of the damper assembly.

8. A top mount assembly as set forth in claim 7 wherein said upper and lower inserts are threadedly connected to said rod support in said channel.

9. A top mount assembly as set forth in claim 7 further including a diaphragm of flexible material extending radially inwardly from an outer segment adjacent said housing to an inner securement segment connected to said rod connection assembly, to define an upper chamber region between said partition assembly and said diaphragm.

10. A top mount assembly as set forth in claim 9 wherein said upper insert further includes a flange extending radially outwardly from said body portion outside of said channel, and wherein said inner securement segment of said diaphragm is axially and sealingly secured between said flange and said rod support.

11. A top mount assembly as set forth in claim 9 further including an elastomeric member disposed radially between said housing and said rod connection assembly to define a lower chamber region between said partition assembly and said elastomeric member;
   a jounce rate washer disposed at least partially radially inwardly from said housing and at least partially axially below said housing, and wherein said elastomeric member extends between said jounce rate washer and said housing;
   a rebound rate washer connected to said rod connection assembly and overlying said elastomeric member in said lower chamber region to limit upward axial movement of said elastomeric member;
   said lower insert includes a lip portion extending radially outwardly from said shaft portion of said lower insert outside of said channel; and
   wherein said jounce rate washer and said rebound rate washer are sealed axially between said lip portion and said rod support.

12. A top mount assembly as set forth in claim 1 wherein said partition assembly includes a coil support positioned radially against said housing, said partition assembly further includes a flux ring disposed radially between said resilient member and said coil support, and wherein said at least one passage is defined between said coil support and said flux ring.

13. A top mount assembly as set forth in claim 12 wherein said fluid is a magnetorheological fluid, wherein said coil support defines a coil compartment adjacent to said passage, and wherein said at least one electromagnetic coil is disposed in said coil compartment for generating a magnetic flux across said passage for varying the viscosity of said magnetorheological fluid in said passage to change the damping characteristics of said top mount assembly.

14. A top mount assembly as set forth in claim 13 further including a power source electrically connected to said at least one electromagnetic coil for providing power to said electromagnetic coil.

15. A top mount assembly as set forth in claim 13 further including a controller connected to said at least one electromagnetic coil for selectively controlling the flux generated by said electromagnetic coil.

16. A top mount assembly as set forth in claim 1 further including a diaphragm of flexible material extending radially between said housing and said rod connection assembly to define said upper chamber region between said partition assembly and said diaphragm.

17. A top mount assembly as set forth in claim 16 further including a cap connected to said housing and at least partially overlying said diaphragm for protecting said diaphragm during operation of said top mount assembly.

18. A top mount assembly as set forth in claim 16 further including an elastomeric member disposed radially between said housing and said rod connection assembly on the opposite side of said partition assembly as said diaphragm to define said lower chamber region between said partition assembly and said elastomeric member.

19. A top mount assembly as set forth in claim 18 further including a jounce rate washer disposed at least partially radially inwardly from said housing and at least partially axially below said housing, and wherein said elastomeric member extends between said jounce rate washer and said housing.

20. A top mount assembly as set forth in claim 18 further including a rebound rate washer connected to said rod connection assembly and overlying said elastomeric member in said lower chamber region to limit upward axial movement of said elastomeric member.

* * * * *